United States Patent
Tillack et al.

(10) Patent No.: US 11,965,054 B2
(45) Date of Patent: Apr. 23, 2024

(54) STORAGE-STABLE PIGMENTED ISOCYANATE GROUP-CONTAINING FORMULATIONS WITH ISOCYANATE GROUP-CONTAINING GRINDING RESIN AND USE THEREOF

(71) Applicants: Covestro Intellectual Property GmbH & Co. KG, Leverkusen (DE); Covestro Deutschland AG, Leverkusen (DE)

(72) Inventors: Joerg Tillack, Solingen (DE); Dirk Achten, Leverkusen (DE); Achim Weber, Altbach (DE); Fabian Schuster, Leverkusen (DE)

(73) Assignee: Covestro Intellectual Property GmbH & Co. KG, Leverkusen (DE)

(*) Notice: Subject to any disclaimer, the term of this patent is extended or adjusted under 35 U.S.C. 154(b) by 0 days.

(21) Appl. No.: 17/429,664

(22) PCT Filed: Feb. 24, 2020

(86) PCT No.: PCT/EP2020/054718
§ 371 (c)(1),
(2) Date: Aug. 10, 2021

(87) PCT Pub. No.: WO2020/173846
PCT Pub. Date: Sep. 3, 2020

(65) Prior Publication Data
US 2022/0106427 A1 Apr. 7, 2022

(30) Foreign Application Priority Data
Feb. 28, 2019 (EP) .................................... 19159968

(51) Int. Cl.
| | | |
|---|---|---|
| *C09D 175/04* | (2006.01) | |
| *C08G 18/02* | (2006.01) | |
| *C08G 18/08* | (2006.01) | |
| *C08G 18/73* | (2006.01) | |
| *C08G 18/76* | (2006.01) | |
| *C08G 18/79* | (2006.01) | |
| *C09D 7/41* | (2018.01) | |

(52) U.S. Cl.
CPC ......... *C08G 18/02* (2013.01); *C08G 18/0847* (2013.01); *C08G 18/73* (2013.01); *C08G 18/7621* (2013.01); *C08G 18/792* (2013.01); *C09D 7/41* (2018.01); *C09D 175/04* (2013.01)

(58) Field of Classification Search
CPC ........ C09D 7/41; C09D 175/04; C08G 18/02; C08G 18/0847
See application file for complete search history.

(56) References Cited

U.S. PATENT DOCUMENTS

| | | |
|---|---|---|
| 3,156,576 A | 11/1964 | Grotenhuis et al. |
| 3,996,223 A | 12/1976 | Gupta et al. |
| 4,075,152 A | 2/1978 | Taller |
| 4,255,569 A | 3/1981 | Muller et al. |
| 4,762,752 A | 8/1988 | Haubennestel et al. |
| 4,795,796 A | 1/1989 | Haubennestel et al. |
| 4,837,359 A | 6/1989 | Woynar et al. |
| 4,942,213 A | 7/1990 | Haubennestel et al. |
| 4,960,848 A | 10/1990 | Scholl et al. |
| 4,994,541 A | 2/1991 | Dell et al. |
| 5,064,960 A | 11/1991 | Pedain et al. |
| 5,076,958 A | 12/1991 | Pedain et al. |
| 5,126,170 A | 6/1992 | Zwiener et al. |
| 5,130,463 A | 7/1992 | Haubennestel et al. |
| 5,914,383 A | 6/1999 | Richter et al. |
| 6,111,054 A | 8/2000 | Haubennestel et al. |
| 6,341,856 B1 | 1/2002 | Thompson et al. |
| 7,317,062 B2 | 1/2008 | Pritschins et al. |
| 7,432,329 B2 | 10/2008 | Haubennestel et al. |
| 7,851,544 B2 | 12/2010 | Gobelt et al. |
| 7,947,777 B2 | 5/2011 | Haubennestel et al. |
| 8,362,300 B2 | 1/2013 | Pritschins et al. |
| 8,492,499 B2 | 7/2013 | Haubennestel et al. |
| 2002/0137865 A1 | 9/2002 | Haubennestel et al. |
| 2004/0063844 A1* | 4/2004 | Urs .................... C08G 18/4277 524/492 |
| 2004/0143035 A1 | 7/2004 | Goebelt et al. |
| 2005/0020735 A1 | 1/2005 | Krappe et al. |

(Continued)

FOREIGN PATENT DOCUMENTS

| | | |
|---|---|---|
| DE | 2414413 A1 | 10/1975 |
| DE | 19858817 A1 | 6/2000 |

(Continued)

OTHER PUBLICATIONS

Goldschmidt, S., BASF Handbuch Lackiertechnik, BASF Mnster und Vincentz Verlag, Hannover, 2002, p. 205 ff.

(Continued)

*Primary Examiner* — Michael L Leonard
(74) *Attorney, Agent, or Firm* — The Webb Law Firm

(57) ABSTRACT

The invention relates to storage-stable pigmented formulations containing isocyanate groups, comprising at least one pigment a., at least one component b. containing isocyanate groups, at least one wetting agent and/or dispersant c., at least one isocyanate group-containing grinding resin d. and optionally solvents, wherein the formulation has a viscosity increase of less than 500% after storage at 50° C. over a period of at least 3 days. The invention also relates to the preparation of such formulations and to the use thereof.

12 Claims, No Drawings

(56) References Cited

U.S. PATENT DOCUMENTS

| | | | |
|---|---|---|---|
| 2006/0014857 A1* | 1/2006 | Sapper | C08F 283/006 |
| | | | 523/171 |
| 2006/0089426 A1 | 4/2006 | Haubennestel et al. | |
| 2006/0134334 A1* | 6/2006 | Chilla | B05D 7/14 |
| | | | 427/372.2 |
| 2009/0221745 A1 | 9/2009 | Orth et al. | |
| 2010/0022662 A1 | 1/2010 | Gobelt et al. | |
| 2010/0029834 A1 | 2/2010 | Gobelt et al. | |
| 2010/0099813 A1 | 2/2010 | Gobelt et al. | |
| 2010/0168316 A1 | 6/2010 | Goebelt et al. | |
| 2010/0234552 A1 | 9/2010 | Kitahara | |
| 2013/0165584 A1 | 6/2013 | Ishibashi et al. | |

FOREIGN PATENT DOCUMENTS

| | | | |
|---|---|---|---|
| GB | 1145952 A | 3/1969 | |
| GB | 1244416 A | 9/1971 | |
| JP | H07118263 A | 5/1995 | |

OTHER PUBLICATIONS

International Search Report for Application No. PCT/EP2020/054718, dated Apr. 28, 2020, Authorized officer: Florian Paulus.

J. Prakt. Chem. 336, 1994, pp. 185-200.

Justus Liebigs Annalen der Chemie, vol. 562, 1949, pp. 75-136.

Römpp Chemie Lexikon, 10th ed., Georg Thieme Verlag Stuttgart, 1996.

BYK-Chemie GmbH, Byk Additives & Instruments: "BYKJET-9131—Technical Datasheet", Mar. 1, 2014, XP093067591, Found on the Internet: URL:https://www.byk.com/en/products/additives-by-name/bykjet-9131 [found on Jul. 26, 2023].

* cited by examiner

STORAGE-STABLE PIGMENTED ISOCYANATE GROUP-CONTAINING FORMULATIONS WITH ISOCYANATE GROUP-CONTAINING GRINDING RESIN AND USE THEREOF

CROSS-REFERENCE TO RELATED APPLICATION

This application is a national stage application under 35 U.S.C. § 371 of PCT/EP2020/054718, filed Feb. 24, 2020, which claims the benefit of European Application No. 19159968.7, filed Feb. 28, 2019, each of which is incorporated herein by reference.

FIELD

The invention relates to storage-stable, pigmented, isocyanate group-containing formulations comprising at least one pigment a., at least one isocyanate group-containing component b., at least one wetting agent and/or dispersant c., at least one isocyanate group-containing grinding resin d. and optionally solvents e., wherein the formulation after storage at 50° C. over a period of at least 3 days exhibits a rise in viscosity of less than 500%. The invention further relates to the preparation of such formulations and uses thereof.

BACKGROUND

Pigmented ink formulations for use in digital printing applications, comprising polyurethanes, have been known for a long time. These formulations are predominantly not reactive. Finely dispersed pigments or dissolved dyes are used in conventional solvents, water or oil. For fixing the pigments, the formulations frequently also contain a small proportion of a binder, in particular cases, this binder is a polyurethane. The modification of a pigment with polyurethane is thus described for example in WO 11152353. This modification leads to particularly stable printing.

The treatment of pigments with isocyanates is also known in the literature. For instance, U.S. Pat. No. 3,156,576 from 1964 has already described the modification of pigments, such as carbon black, silicate, titanium dioxide and similar compounds, with isocyanates. The dry pigment is in this case incorporated into a dry toluene/TDI mixture having a TDI content of 10% and the excess liquid is subsequently evaporated at 75° C. The dry pigment thus modified is then immediately incorporated, with exclusion of moisture, into a silicone which is then cured.

U.S. Pat. No. 4,075,152 describes a process for preventing the flocculation of pigments in 2K PU coating materials. To this end, first an isocyanate/pigment slurry is produced and directly afterward this slurry is mixed into a polyol. The colored OH-functional polyurethane pastes obtained did not display any pigment flocculation.

Although it is mentioned in the examples given that the pretreatment of pigments with isocyanates can be advantageous, no teaching can be found here regarding how a storage-stable, pigmented, isocyanate group-containing formulation can be produced.

U.S. Pat. No. 6,341,856 describes the production of a reactive ink for digital printing. Here, compounds having at least one C—H-active group, compounds having blocked C—H-reactive groups, which prevents the reaction of the active hydrogen with the C—H-reactive group, emulsifiers and pigments or dyes are processed to give an inkjet ink that is stable at room temperature. Polyols and isocyanates are also mentioned explicitly as reactive components.

DE 198 58 817 A1 discloses aqueous reactive two-component binder combinations for aqueous reactive spackling compounds, processes for preparing aqueous reactive spackling compounds based on aqueous reactive two-component binder combinations and the use of such spackling compounds.

US 2006 014857 A1 relates to an aqueous color- and/or effect-imparting coating material which is free from rheological aids based on phyllosilicates and comprises (A) at least one water-soluble, water-dilutable and/or water-dispersible polyurethane selected from the group consisting of polyurethanes which are grafted with olefinically unsaturated compounds, are ionically or ionically and nonionically stabilized and are based on polyisocyanates selected from the group consisting of aliphatic, cycloaliphatic, aliphatic-cycloaliphatic, aromatic, aliphatic-aromatic and cycloaliphatic-aromatic polyisocyanates; (B) at least one color- and/or effect-imparting pigment; (C) at least one dispersing assistant for the color- and/or effect-imparting pigments, selected from the group consisting of the reaction products of (c1) at least one functionalized copolymer containing (c11) at least one copolymerized olefinically unsaturated monomer selected from the group consisting of olefinically unsaturated monomers containing at least one reactive functional group selected from the group consisting of isocyanate groups, anhydride groups and epoxy groups; and (c12) at least one copolymerized olefinically unsaturated monomer which is free from isocyanate-, anhydride- and epoxy-reactive functional groups; (c2) at least one homopolymeric polyalkylene glycol, and (c3) at least one compound of the general formula 1: $NR_2—C(O)—NR_2$ (1), in which the variables R are selected from the group consisting of hydrogen atoms and organic, saturated and unsaturated, substituted and unsubstituted, aliphatic, cycloaliphatic, aliphatic-cycloaliphatic, aromatic, aliphatic-aromatic and cycloaliphatic-aromatic radicals which may contain at least one amino group —NH—, at least one oxygen atom —O— and/or at least one sulfur atom —S— and/or may be cyclically linked to one another, at least one organic radical R being present and the radical R or at least one of the radicals R containing at least one reactive functional group selected from the group consisting of isocyanate-, anhydride- and epoxy-reactive groups; and (D) at least one rheological aid based on (meth)acrylate copolymers.

The blocking of the isocyanate component before mixing with the polyol component can be effected either chemically or by means of encapsulation.

A disadvantage of this embodiment is the blocking. It is complex and therefore expensive. In addition, the isocyanate groups first have to be deblocked again, for example by heating, so that they are available for a reaction.

SUMMARY

It was therefore an object to at least partially overcome at least one disadvantage of the prior art.

A further object of the invention was to provide a pigment-containing formulation which contains reactive isocyanate groups during its processing. These groups can then react with reaction partners directly after application without complex deblocking.

It was additionally an object of the invention to provide a pigment-containing formulation which has reactive isocyanate groups over as long as possible a processing period, preferably over a plurality of weeks or preferably over a plurality of months.

It was also an object of the invention to provide a process which makes it possible to generate a storage-stable, isocyanate group-containing formulation.

A further object of the invention was to provide an isocyanate group-containing formulation in the form of a color paste, preferably in the form of an ink, in particular in the form of an ink for digital printing.

DETAILED DESCRIPTION

The invention firstly provides a storage-stable, isocyanate group-containing formulation comprising the components:
  a. at least one pigment,
  b. optionally at least one isocyanate group-containing component which has free isocyanate groups,
  c. at least one wetting agent and/or dispersant,
  d. at least one isocyanate group-containing grinding resin comprising free isocyanate groups and
  e. optionally solvents, characterized in that the formulation after storage at 50° C. over a period of at least 3 days exhibits a rise in viscosity of less than 500%, based on the starting viscosity of the formulation which is determined as of 1 hour after combining all of the desired components, in particular components a. to e, wherein the viscosity determination is carried out in each case at 20° C. a shear rate of 500 [1/s], wherein the molar ratio of the sum of all isocyanate groups of the isocyanate-containing formulation to the sum of all isocyanate-reactive groups which are not isocyanate groups in the formulation is at least 8:1.

The viscosity determination is preferably carried out using a Physica MCR 301 (Anton Paar GmbH) with a plate/plate (diameter 40 mm) measurement geometry at 20° C. measurement temperature. It is preferred that after storage at 50° C. over a period of at least 3 days, or preferably of at least 5 days, or preferably of at least 7 days, or preferably of at least 10 days, or preferably of at least 14 days, exhibits a rise in viscosity of less than 500%, preferably of less than 300%, or preferably of less than 200%, or preferably of less than 100%, or preferably of less than 50%, based on the starting viscosity of the formulation. The starting viscosity is defined according to the invention as the viscosity as of 1 hour after combining all of the desired components, in particular the selected components a. to e.

The molar ratio of the sum of all isocyanate groups of the isocyanate-containing formulation, in particular of the sum of all isocyanate groups of components b. and d. to the sum of all isocyanate-reactive groups in the isocyanate-containing formulation which are not isocyanate groups is preferably at least 11:1, or preferably at least 15:1, or preferably at least 20:1, or preferably at least 50:1, or preferably at least 100:1.

In a preferred embodiment of the formulation, the isocyanate group-containing grinding resin d. has a viscosity in a range from 100 to 5000 mPas, preferably in a range from 200 to 2000 mPas, particularly preferably in a range from 350 to 1000 mPas.

In a preferred embodiment of the formulation, the formulation contains
  a. 0.01% to 45% by weight, preferably 0.1% to 15% by weight, or preferably 0.1% to 10% by weight, or preferably 0.2% to 8% by weight, or preferably 0.5% to 5% by weight, of the at least one pigment;
  b. 0% to 99% by weight, preferably 1% to 98% by weight, or preferably 5% to 95% by weight, or preferably 10% to 93% by weight, or preferably 20% to 93% by weight, or preferably 40% to 93% by weight, of the at least one isocyanate group-containing component which has free isocyanate groups;
  c. 0.01% to 20% by weight, preferably 0.05% to 15% by weight, or preferably 0.1% to 10% by weight, of the at least one wetting agent and/or dispersant;
  d. 0.1% to 35% by weight, preferably 0.5% to 25% by weight, or preferably 1% to 15% by weight, of the at least one isocyanate group-containing grinding resin comprising free isocyanate groups;
  e. 0% to 80% by weight, preferably 0% to 75% by weight, or preferably 0% to 50% by weight, or preferably 0% to 20% by weight, or preferably 0% to 10% by weight, or preferably 0.1% to 30% by weight, of solvents;
in each case based on the total amount of the formulation, with the sum of all constituents in the formulation not exceeding 100% by weight.

The invention preferably relates to a storage-stable, isocyanate group-containing formulation comprising the components:
  a. 0.01% to 45% by weight, preferably 0.1% to 15% by weight, or preferably 0.1% to 10% by weight, or preferably 0.2% to 8% by weight, or preferably 0.5% to 5% by weight of the at least one pigment;
  b. 0% to 99% by weight, preferably 1% to 98% by weight, or preferably 5% to 95% by weight, or preferably 10% to 93% by weight, or preferably 20% to 93% by weight, or preferably 40% to 93% by weight of the at least one isocyanate group-containing component which has free isocyanate groups;
  c. 0.01% to 20% by weight, preferably 0.05% to 15% by weight, or preferably 0.1% to 10% by weight of the at least one wetting agent and/or dispersant;
  d. 0.1% to 35% by weight, preferably 0.5% to 25% by weight, or preferably 1% to 15% by weight of the at least one isocyanate group-containing grinding resin comprising free isocyanate groups;
  e. 0% to 80% by weight, preferably 0% to 75% by weight, or preferably 0% to 50% by weight, or preferably 0% to 20% by weight, or preferably 0% to 10% by weight, or preferably 0.1% to 30% by weight of solvents;
in each case based on the total amount of the formulation, with the sum of all constituents in the formulation not exceeding 100% by weight and wherein the molar ratio of the sum of all isocyanate groups of the isocyanate-containing formulation to the sum of all isocyanate-reactive groups which are not isocyanate groups in the formulation is at least 8:1.

The formulation preferably comprises:
  a. 0.5% to 5% by weight of the at least one pigment;
  b. 40% to 93% by weight of the at least one isocyanate group-containing component which has free isocyanate groups;
  c. 0.1% to 10% by weight of the at least one wetting agent and/or dispersant;
  d. 1% to 15% by weight of the at least one isocyanate group-containing grinding resin comprising free isocyanate groups;
  e. 0% to 30% by weight of solvents,
in each case based on the total amount of the formulation, with the sum of all constituents in the formulation not exceeding 100% by weight, wherein the molar ratio of the sum of the isocyanate groups of components b. and d. to the sum of all isocyanate-reactive groups in the formulation which are not isocyanate groups is at least 8:1, more preferably at least 11:1, particularly preferably at least 20:1.

Stable, in particular storage-stable, isocyanate group-containing formulations within the context of the invention are preferably distinguished by the fact that the viscosity during a storage of at least 3 days, or preferably at least 5 days, or preferably of at least 7 days, or preferably of at least 10 days, or preferably of at least 14 days, at 50° C. merely exhibit a rise in viscosity of ≤500%, preferably of ≤300%, or preferably of ≤200%, or preferably of ≤100%, or preferably of ≤50%. Especially preferably, the rise in the viscosity during a storage of 3 days at 50° C. of the formulation is ≤100%, based on the starting viscosity. More preferably, the rise in the particle size of the isocyanate group-containing formulation, measured with dynamic light scattering after redispersion of any soft sediments formed, based on the Z-average, is at most 500%, preferably at most 200%, preferably at most 100%, preferably at most 50%. "Soft sediments" are understood within the context of the invention to mean that the sediments redisperse as a result of shaking.

More preferably, the formulation at the time of determination of the starting viscosity or after storage thereof for at least 3 days, or preferably for at least 10 days, or preferably for at least 14 days, has a content of isocyanate groups in a range from 2% to 60% by weight, or preferably in a range from 3% to 50% by weight, or preferably in a range from 4% to 35% by weight, or preferably in a range from 5% to 20% by weight, based on the total amount of the formulation.

It is preferable for the isocyanate group-containing formulation to preferably not comprise any hard sediments. "Hard sediments" are understood within the context of the invention to mean that the sediments cannot be redispersed by shaking. "Shaking" is preferably understood to mean shaking by hand or by means of customary laboratory shaking machines. A customary laboratory shaker that can be used is an IKA® VORTEX 2 at a speed of 2000 rpm, with the shaking time preferably being in a range from 10 to 60 seconds, or preferably in a range from 15 to 40 seconds.

Pigments

The pigments used can be any pigments which would be used by those skilled in the art for a stable formulation. Pigments which preferably find use as component a. can be divided into a number of classes: organic or inorganic pigments which are present dispersed as a solids dispersion in the form of particles, if necessary with the aid of a suitable wetting agent and/or dispersant. The pigments are either used individually or as a mixture of at least two of these.

The at least one pigment can be selected from a large number of pigment classes. If the application corresponds to printing techniques, in particular to inkjet printing, pigment particles having a diameter of less than or equal to 100 μm, preferably less than or equal to 10 μm or preferably less than or equal to 5 μm, are advantageous.

Examples of suitable organic pigments are:
monoazo pigments:
C.I. Pigment Brown 25; C.I. Pigment Orange 5, 13, 36 and 67;
C.I. Pigment Red 1, 2, 3, 5, 8, 9, 12, 17, 22, 23, 31, 48:1, 48:2, 48:3, 48:4, 49, 49:1, 52:1, 52:2, 53, 53: 1, 53: 3, 57: 1, 251, 112, 146, 170, 184, 210 and 245;
C.I. Pigment Yellow 1, 3, 73, 74, 65, 97, 151 and 183;
naphthol AS pigments:
C.I. Pigment Brown 1;
C.I. Pigment Orange 22, 24, 38;
C.I. Pigment Red 2, 5, 7, 8, 9, 10, 11, 12, 13, 14, 15, 16, 17, 18, 21, 22, 23, 31, 32, 95, 112, 114, 119, 136, 146,147, 148, 150, 151, 164, 170, 184, 187, 188, 210, 212, 213, 222, 223, 237, 239, 240, 243, 245, 247, 253, 256, 258, 261, 266, 267, 268, 269;
C.I. Pigment Violet 13, 25, 44, 50;
disazo pigments:
C.I. Pigment Brown 23;
C.I. Pigment Orange 15, 16, 34 and 44;
C.I. Pigment Red 144, 166, 214, 220, 221 242 and 248;
C.I. Pigment Yellow 12, 13, 14, 16, 17, 55, 63, 81, 83, 87, 90, 106, 113, 114, 121, 126, 127, 152, 155, 170, 171, 172, 174, 176 and 188;
benzimidazolone pigments:
C.I. Pigment Brown 25
C.I. Orange 36, 60, 62, 72
C.I. Pigment Red 171, 175, 176, 185, 208
C.I. Yellow 120, 151, 154, 175, 180, 181, 194
C.I. Violet 32;
anthanthrone pigments:

C.I. Pigment Orange 77;
C.I. Pigment Red 168 (C.I. Vat Orange 3);
anthraquinone pigments:

C.I. Pigment Yellow 147, 193, 199, and 202;
C.I. Pigment Violet 31;
anthrapyrimidine pigments:

C.I. Pigment Yellow 108 (C.I. Vat Yellow 20);
quinacridone pigments:

C.I. Pigment Red 122, 202 and 206;
C.I. Pigment Violet 19;
quinophthalone pigments:

C.I. Pigment Yellow 138;
diketopyrrolopyrrole pigments:

C.I. Pigment Orange 71 and 73;
C.I. Pigment Red 254, 255, 264, and 272
dioxazine pigments:

C.I. Pigment Violet 23 and 37;
flavanthrone pigments:

C.I. Pigment Yellow 24 (C.I. Vat Yellow 1);
indanthrone pigments:

C.I. Pigment Blue 60 (C.I. Vat Blue 4) and 64 (C.I. Vat Blue 6);
isoindoline pigments:

C.I. Pigment Brown 38;
C.I. Pigment Orange 66 and 69;
C.I. Pigment Red 260;
C.I. Pigment Yellow 139 and 185;
isoindolinone pigments:

C.I. Pigment Orange 61;
C.I. Pigment Red 257 and 260;
C.I. Pigment Yellow 109, 110, 173 and 185;
isoviolanthrone pigments:

C.I. Pigment Violet 31 (C.I. Vat Violet 1);
metal complex pigments:

C.I. Pigment Green 8 and 10;
C.I. Pigment Red 257
C.I. Pigment Yellow 117, 129, 150 and 153;
perinone pigments:

C.I. Pigment Orange 43 (C.I. Vat Orange 7);
C.I. Pigment Red 194 (C.I. Vat Red 15);
perylene pigments:

C.I. Pigment Black 31 and 32;
C.I. Pigment Red 123, 149, 178, 179 (C.I. Vat Red 23), 190 (C.I. Vat Red 29) and 224;

C.I. Pigment Violet 29;
phthalocyanine pigments:

C.I. Pigment Blue 15, 15 : 1, 15 : 2, 15 : 3, 15 : 4, 15 : 6 and 16;
C.I. Pigment Green 7 and 36;
pyranthrone pigments:

C.I. Pigment Orange 40 and 51;
C.I. Pigment Red 216 (C.I. Vat Orange 4), 226;
thioindigo pigments:

C.I. Pigment Red 88 and 181 (C.I. Vat Red 1);
C.I. Pigment Violet 38 (C.I. Vat Violet 3);
triarylcarbonium pigments:

C.I. Pigment Blue 1, 2, 9, 10, 14, 61 and 62;
C.I. Pigment Green 1 and 4;
C.I. Pigment Red 81, 81 : 1 and 169;
C.I. Pigment Violet 1, 2, 3, 27 and 39;
C.I. Pigment Black 1 (aniline black);
C.I. Pigment Yellow 101 (aldazine yellow);
C.I. Pigment Brown 22;
The at least one pigment is preferably selected from the group
consisting of P.B. 15:4 (e.g. Hostaperm ® Blue BT-617-D),
P.V. 19 (e.g. Inkjet Magenta 5EB02),
P.Y. 155 (e.g. Inkjet Yellow 4GC) or a mixture of at least two of these.
Examples of suitable inorganic pigments:
white pigments:

titanium dioxide (C.I. Pigment White 6), zinc white, pigment
grade zinc oxide; zinc sulfide, lithopone; lead white;
black pigments:

iron oxide black (C.I. Pigment Black 11), iron manganese black,
spinel black (C.I. Pigment Black 27); carbon black
(C.I. Pigment Black 7);
chromatic pigments:

chromium oxide, chromium oxide hydrate green; chromium green
(C.I. Pigment Green 48); cobalt green (C.I. Pigment Green 50);
ultramarine green; cobalt blue (C.I. Pigment Blue 28 and 36);
ultramarine blue; iron blue (C.I. Pigment Blue 27); manganese blue;
ultramarine violet; cobalt violet and manganese violet;

iron oxide red (C.I Pigment Red 101); cadmium sulfoselenide (C.I. Pigment Red 108); molybdate red (C.I. Pigment Red 104); ultramarine red;

iron oxide brown, mixed brown, spinel and corundum phases (C.I. Pigment Brown 24, 29 and 31), chromium orange;

iron oxide yellow (C.I Pigment Yellow 42); nickel titanium yellow (C.I. Pigment Yellow 53; C.I. Pigment Yellow 157 and 164); chromium titanium yellow; cadmium sulfide and cadmium zinc sulfide (C.I. Pigment Yellow 37 and 35); chromium yellow (C.I. Pigment Yellow 34), zinc yellow, alkaline earth metal chromates; Naples yellow; bismuth vanadate (C.I. Pigment Yellow 184);

Interference Pigments:

metal effect pigments based on coated metal platelets; pearlescent pigments based on metal oxide-coated mica platelets; liquid crystal pigments.

The at least one pigment is preferably selected from the group consisting of P.W. 6 (e.g. Kronos® 2310), Pigment Black 6 or 7 (e.g. NIPex® 35) or a mixture of these.

The isocyanate group-containing component b. can be any component which comprises at least one isocyanate group and would be selected by those skilled in the art for the storage-stable formulation. Component b. preferably comprises a polyisocyanate.

The term "polyisocyanate" as used here is a collective term for compounds containing two or more isocyanate groups —N═C═O in the molecule. Preferred representatives of these polyisocyanates are the diisocyanates. These have the general structure O═C═N—R—N═C═O where R typically represents aliphatic, alicyclic, araliphatic and/or aromatic radicals.

Where reference is made here to "isocyanates" in general terms, this means both monoisocyanates and monomeric and/or oligomeric polyisocyanates alike. For the understanding of many aspects of the invention, however, it is important to distinguish between monomeric diisocyanates and oligomeric polyisocyanates. Where reference is made here to "oligomeric polyisocyanates", this means polyisocyanates formed from at least two monomeric diisocyanate molecules, i.e. compounds that constitute or contain a reaction product formed from at least two monomeric diisocyanate molecules.

Preferably, at least one of the monomeric or oligomeric polyisocyanates present in the isocyanate group-containing component b. has an (average) NCO functionality of 2.0 to 6.0, or preferably from 2.3 to 4.5.

Monomeric polyisocyanates suitable for use in the isocyanate component are preferably those monomeric polyisocyanates having a molecular weight in the range from 140 to 400 g/mol which contain aliphatically, cycloaliphatically, araliphatically and/or aromatically bonded isocyanate groups. These polyisocyanates are obtainable in various ways, for example by phosgenation in the liquid or gas phase or by a phosgene-free route, for example by thermal urethane cleavage.

Preferred monomeric isocyanates having aliphatically bonded isocyanate groups are 1,4-diisocyanatobutane (PDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane and 1,10-diisocyanatodecane.

In a preferred embodiment of the formulation, the isocyanate group-containing component b. is selected from the group consisting of consisting of 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane and 1,10-diisocyanatodecane, 1,3- and 1,4-bis(isocyanatomethyl)benzene (xylylene diisocyanate; XDI), 1,3- and 1,4-bis(1-isocyanato-1-methylethyl)benzene (TMXDI), 2,4- and 2,6-diisocyanatotoluene (TDI), 2,4'- and 4,4'-diisocyanatodiphenylmethane (MDI) and 1,5-diisocyanatonaphthalene, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), or a mixture of at least two of these, and optionally oligomers and reaction products of these.

In a preferred embodiment of the formulation, the isocyanate group-containing grinding resin d. is selected from the group consisting of consisting of 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- and 2,4,4-trimethyl-1,6-diisocyanatohexane and 1,10-diisocyanatodecane, 1,3- and 1,4-bis(isocyanatomethyl)benzene (xylylene diisocyanate; XDI), 1,3- and 1,4-bis(1-isocyanato-1-methylethyl)benzene (TMXDI), 2,4- and 2,6-diisocyanatotoluene (TDI), 2,4'- and 4,4'-diisocyanatodiphenylmethane (MDI) and 1,5-diisocyanatonaphthalene, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), or a mixture of at least two of these, and optionally oligomers and reaction products of these.

The isocyanate group-containing grinding resin d. and the isocyanate group-containing component b. may be identical or different. Component b. and component d. are preferably different.

The isocyanate group-containing component b. preferably comprises monomeric isocyanates having cycloaliphatically bonded isocyanate groups selected from the group consisting of 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane and 1,3-dimethyl-5,7-diisocyanatoadamantane.

Preferred monomeric isocyanates having araliphatically bonded isocyanate groups are 1,3- and 1,4-bis(isocyanatomethyl)benzene (xylylene diisocyanate; XDI), 1,3- and 1,4-bis(1-isocyanato-1-methylethyl)benzene (TMXDI).

Preferred monomeric isocyanates having aromatically bonded isocyanate groups are 2,4- and 2,6-diisocyanatotoluene (TDI), 2,4'- and 4,4'-diisocyanatodiphenylmethane (MDI) and 1,5-diisocyanatonaphthalene.

Further diisocyanates which are likewise suitable are additionally found, for example, in Justus Liebigs Annalen der Chemie Volume 562 (1949) p. 75-136.

The isocyanate group-containing component b. preferably contains at least 40% by weight, preferably at least 50% by weight, or preferably at least 60% by weight, or preferably at least 70% by weight, or preferably at least 80% by weight, or preferably at least 90% by weight, aliphatic or cycloaliphatic isocyanates, based on the total amount of isocyanate group-containing component b.

In one preferred embodiment of the formulation, the formulation comprises the isocyanate group-containing component b., wherein the isocyanate group-containing component b. consists of aliphatic or cycloaliphatic isocyanates.

Preferably, the isocyanate group-containing component b. used can be at least one polyisocyanate. Oligomeric polyisocyanates usable with preference are obtainable from the abovedescribed monomeric polyisocyanates by the process of "modification" of monomeric polyisocyanates which is described in the following section. Oligomeric polyisocyanates may be obtained here by modification of individual representatives of the abovementioned monomeric polyisocyanates. However, it is also possible to modify mixtures of at least two of the abovementioned monomeric polyisocyanates with the result that oligomeric polyisocyanates constructed from at least two different monomers are obtained.

The preparation of oligomeric polyisocyanates from monomeric diisocyanates is also referred to here as modification of monomeric diisocyanates. This "modification" as used here means the reaction of monomeric diisocyanates to give oligomeric polyisocyanates having uretdione, isocyanurate, allophanate, biuret, iminooxadiazinedione and/or oxadiazinetrione structure.

For example, hexamethylene diisocyanate (HDI) is a "monomeric diisocyanate" since it contains two isocyanate groups and is not a reaction product of at least two polyisocyanate molecules:

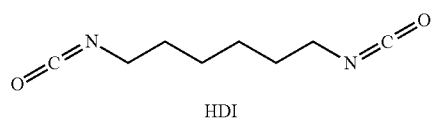

HDI

By contrast, reaction products of at least two HDI molecules which still have at least two isocyanate groups are "oligomeric polyisocyanates" in the context of the invention. Proceeding from monomeric HDI, representatives of such "oligomeric polyisocyanates" include for example the HDI isocyanurate and the HDI biuret each constructed from three monomeric HDI units:

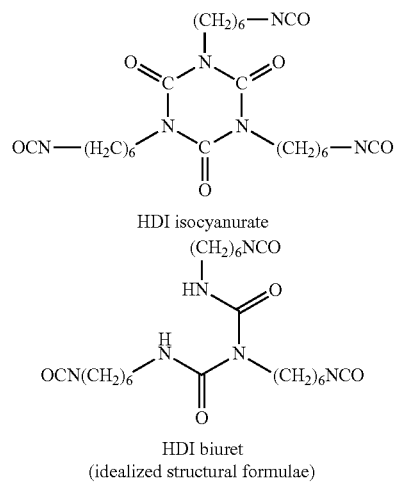

HDI isocyanurate

HDI biuret
(idealized structural formulae)

According to the invention, the oligomeric polyisocyanates may in particular have uretdione, isocyanurate, allophanate, biuret, iminooxadiazinedione and/or oxadiazinetrione structure. In one embodiment of the invention, the oligomeric polyisocyanates have at least one of the following oligomeric structure types or mixtures thereof:

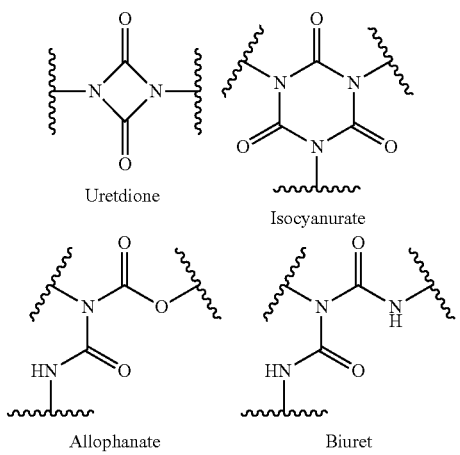

Uretdione

Isocyanurate

Allophanate

Biuret

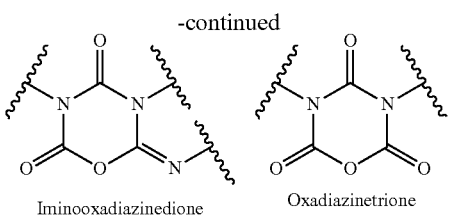

Iminooxadiazinedione          Oxadiazinetrione

It is advantageous to use oligomeric polyisocyanates which constitute a mixture of at least two oligomeric polyisocyanates, the at least two oligomeric polyisocyanates differing in terms of structure. This structure is preferably selected from the group consisting of uretdione, isocyanurate, allophanate, biuret, iminooxadiazinedione and oxadiazinetrione structure, and mixtures thereof. Particularly compared to crosslinking reactions with oligomeric polyisocyanates of just one defined structure, starting mixtures of this kind can lead to an effect on the Tg value, which is advantageous for many applications.

Preference is given to using, in the process according to the invention, an isocyanate group-containing component b. containing at least one oligomeric polyisocyanate having biuret, allophanate, isocyanurate and/or iminooxadiazinedione structure and optionally mixtures thereof.

An oligomeric polyisocyanate present in the isocyanate group-containing component b. is preferably one that contains only a single defined oligomeric structure, for example exclusively or mostly isocyanurate structure. However, as a consequence of production the oligomeric polyisocyanates employed according to the invention generally always contain a plurality of different oligomeric structures next to each other.

In the context of the present invention, oligomeric polyisocyanate is regarded as being constructed from a single defined oligomeric structure when an oligomeric structure selected from uretdione, isocyanurate, allophanate, biuret, iminooxadiazinedione and/or oxadiazinetrione structure is present to an extent of at least 50 mol %, by preference 60 mol %, preferably 70 mol %, particularly preferably 80 mol %, especially 90 mol %, based in each case on the sum total of the oligomeric structures from the group consisting of uretdione, isocyanurate, allophanate, biuret, iminooxadiazinedione and oxadiazinetrione structure present in the oligomeric polyisocyanate.

Preference is given to using an oligomeric polyisocyanate of a single defined oligomeric structure, where the oligomeric structure is selected from uretdione, isocyanurate, allophanate, biuret, iminooxadiazinedione and/or oxadiazinetrione structure and is present to an extent of at least 50 mol %, by preference 60 mol %, preferably 70 mol %, particularly preferably 80 mol %, especially 90 mol %, based in each case on the sum total of the oligomeric structures from the group consisting of uretdione, isocyanurate, allophanate, biuret, iminooxadiazinedione and oxadiazinetrione structure present in the oligomeric polyisocyanate.

The oligomeric polyisocyanates are preferably ones which mainly have an isocyanurate structure and which may contain the abovementioned uretdione, allophanate, biuret, iminooxadiazinedione and/or oxadiazinetrione structure only as byproducts. One embodiment of the invention thus provides for the use of an oligomeric polyisocyanate of a single defined oligomeric structure, where the oligomeric structure is an isocyanurate structure and is present to an extent of at least 50 mol %, by preference 60 mol %, preferably 70 mol %, particularly preferably 80 mol %, especially 90 mol %, based in each case on the sum total of the oligomeric structures from the group consisting of uretdione, isocyanurate, allophanate, biuret, iminooxadiazinedione and oxadiazinetrione structure present in the polyisocyanate.

It is also possible to use oligomeric polyisocyanates having very substantially no isocyanurate structure, and containing mainly at least one of the abovementioned uretdione, allophanate, biuret, iminooxadiazinedione and/or oxadiazinetrione structure types. In a particular embodiment of the invention, the oligomeric polyisocyanate used consists of at least 50 mol %, by preference 60 mol %, preferably 70 mol %, particularly preferably 80 mol %, especially 90 mol %, based in each case on the sum total of the oligomeric structures from the group consisting of uretdione, isocyanurate, allophanate, biuret, iminooxadiazinedione and oxadiazinetrione structure present in the polyisocyanate, of oligomeric polyisocyanates having a structure type selected from the group consisting of uretdione, allophanate, biuret, iminooxadiazinedione and/or oxadiazinetrione structure.

Preference is given to the use of a low-isocyanurate polyisocyanate having, based on the sum total of the oligomeric structures from the group consisting of uretdione, isocyanurate, allophanate, biuret, iminooxadiazinedione and oxadiazinetrione structure present in the polyisocyanate, at most 50 mol %, by preference at most 40 mol %, preferably at most 30 mol %, particularly preferably at most 20 mol %, 10 mol % or 5 mol % of isocyanurate structures.

Preference is given to using an oligomeric polyisocyanate of a single defined oligomeric structure type, where the oligomeric structure type is selected from the group consisting of uretdione, allophanate, biuret, iminooxadiazinedione and/or oxadiazinetrione structure and this structure type is present to an extent of at least 50 mol %, by preference 60 mol %, preferably 70 mol %, particularly preferably 80 mol %, especially 90 mol %, based on the sum total of the oligomeric structures from the group consisting of uretdione, isocyanurate, allophanate, biuret, iminooxadiazinedione and oxadiazinetrione structure present in the polyisocyanate.

The proportions of uretdione, isocyanurate, allophanate, biuret, iminooxadiazinedione and/or oxadiazinetrione structure in the isocyanate group-containing component b. can be determined for example by NMR spectroscopy. Preferably employable here is 13C NMR spectroscopy, preferably in proton-decoupled form, since the oligomeric structures mentioned give characteristic signals.

Processes for preparing the oligomeric polyisocyanates that are preferably to be used in the isocyanate group-containing component b. and have uretdione, isocyanurate, allophanate, biuret, iminooxadiazinedione and/or oxadiazinedione structure have been described for example in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

Preferably, a usable oligomeric polyisocyanate is defined in that it contains oligomeric polyisocyanates which have been obtained from monomeric diisocyanates, irrespective of the nature of the modification reaction used, with observation of an oligomerization level of from 5% to 45%, preferably 10% to 40%, particularly preferably 15% to 30%. "Oligomerization level" is understood here to mean the percentage of isocyanate groups originally present in the starting mixture which are consumed during the preparation process to form uretdione, isocyanurate, allophanate, biuret, iminooxadiazinedione and/or oxadiazinetrione structures.

Preference is given to using, as oligomeric polyisocyanate, an isocyanate-terminated prepolymers. These prepolymers are known to those skilled in the art and are obtainable by reaction of an excess of a suitable monomeric isocyanate, as described hereinabove, with a suitable compound bearing isocyanate-reactive groups.

In the context of the present, invention isocyanate-reactive groups are to be understood as meaning amine, amide, urethane, alcohol, thiol, epoxide, carboxylic acid, carboxylic anhydride groups or groups containing Zerewitinoff-active hydrogen. For the definition of Zerewitinoff-active hydrogen reference is made to Rompp Chemie Lexikon, Georg Thieme Verlag Stuttgart. Isocyanate-reactive groups are preferably to be understood as meaning OH, NH and/or SH. Although isocyanate groups can also react with themselves, these are expressly not included here.

Examples of compounds having isocyanate-reactive groups are monohydric, dihydric and polyhydric alcohols having primary, secondary and tertiary OH groups, analogous thiols, polyols, for example polyether polyols, polyester polyols, polyacrylate polyols, polycarbonate polyols, analogous polythiols, sulfur-containing hydroxyl compounds, amines (for example primary, secondary, aliphatic, cycloaliphatic, aromatic, sterically hindered), polyamines and aspartic esters.

Alcohols may be for example low molecular weight diols (for example ethane-1,2-diol, propane-1,3- or -1,2-diol, butane-1,4-diol), triols (for example glycerol, trimethylolpropane) and tetraols (for example pentaerythritol) but also higher molecular weight polyhydroxyl compounds such as polyether polyols, polyester polyols, polycarbonate polyols, polysiloxane polyols and polybutadiene polyols.

Polyether polyols are obtainable in a manner known per se, by alkoxylation of suitable starter molecules under base catalysis or using double metal cyanide compounds (DMC compounds). Examples of suitable starter molecules for the preparation of polyether polyols are simple low molecular weight polyols, water, organic polyamines having at least two N—H bonds, or any mixtures of such starter molecules. Preferred starter molecules for the preparation of polyether polyols by alkoxylation, in particular by the DMC process, are in particular simple polyols such as ethylene glycol, propylene 1,3-glycol and butane-1,4-diol, hexane-1,6-diol, neopentyl glycol, 2-ethylhexane-1,3-diol, glycerol, trimethylolpropane, pentaerythritol, and low molecular weight, hydroxyl group-containing esters of such polyols with dicarboxylic acids of the type specified hereinafter by way of example, or low molecular weight ethoxylation or propoxylation products of such simple polyols, or any desired mixtures of such modified or unmodified alcohols. Alkylene oxides suitable for the alkoxylation are especially ethylene oxide and/or propylene oxide, which can be used in the alkoxylation in any sequence or else in a mixture.

Polyester polyols can be prepared in a known manner by polycondensation of low molecular weight polycarboxylic acid derivatives, for example succinic acid, adipic acid, suberic acid, azelaic acid, sebacic acid, dodecanedioic acid, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, succinic acid, dimer fatty acid, trimer fatty acid, phthalic acid, phthalic anhydride, isophthalic acid, terephthalic acid, citric acid or trimellitic acid, with low molecular weight polyols, for example ethylene glycol, diethylene glycol, neopentyl glycol, hexanediol, butanediol, propylene glycol, glycerol, trimethylolpropane, 1,4-hydroxymethylcyclohexane, 2-methylpropane-1,3-diol, butane-1,2,4-triol, triethylene glycol, tetraethylene glycol, polyethylene glycol, dipropylene glycol, polypropylene glycol, dibutylene glycol and polybutylene glycol, or by ring-opening polymerization of cyclic carboxylic esters such as ε-caprolactone. It is moreover also possible to polycondense hydroxycarboxylic acid derivatives, for example lactic acid, cinnamic acid or w-hydroxycaproic acid to form polyester polyols. However, it is also possible to use polyester polyols of oleochemical origin. Such polyester polyols can be prepared, for example, by full ring-opening of epoxidized triglycerides of an at least partly olefinically unsaturated fatty acid-containing fat mixture with one or more alcohols having 1 to 12 carbon atoms and by subsequent partial transesterification of the triglyceride derivatives to alkyl ester polyols having 1 to 12 carbon atoms in the alkyl radical.

The preparation of suitable polyacrylate polyols is known per se to those skilled in the art. They are obtained by free-radical polymerization of olefinically unsaturated monomers having hydroxyl groups or by free-radical copolymerization of olefinically unsaturated monomers having hydroxyl groups with optionally different olefinically unsaturated monomers, for example ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile, and/or methacrylonitrile. Suitable olefinically unsaturated monomers having hydroxyl groups are in particular 2-hydroxyethyl acrylate, 2-hydroxyethyl methacrylate, the hydroxypropyl acrylate isomer mixture obtainable by addition of propylene oxide onto acrylic acid, and the hydroxypropyl methacrylate isomer mixture obtainable by addition of propylene oxide onto methacrylic acid. Suitable free-radical initiators are those from the group of the azo compounds, for example azoisobutyronitrile (AIBN), or from the group of the peroxides, for example di-tert-butyl peroxide.

Amines can be any desired monofunctional or polyfunctional amines, for example methylamine, ethylamine, n-propylamine, isopropylamine, the isomeric butylamines, pentylamines, hexylamines and octylamines, n-dodecylamine, n-tetradecylamine, n-hexadecylamine, n-octadecylamine, cyclohexylamine, the isomeric methylcyclohexylamines, aminomethylcyclohexane, dimethylamine, diethylamine, dipropylamine, diisopropylamine, dibutylamine, diisobutylamine, bis(2-ethylhexyl)amine, N-methyl- and N-ethylcyclohexylamine, dicyclohexylamine, hydrazine, ethylenediamine, 1,2-diaminopropane, 1,4-diaminobutane, 2-methylpentamethylenediamine, 1,6-diaminohexane, 2,2, 4- and 2,4,4-trimethylhexamethylenediamine, 1,2-diaminocyclohexane, 1-amino-3,3,5-trimethyl-5-aminomethylcyclohexane (isophoronediamine, IPDA), 4,4'-diaminodicyclohexylmethane, pyrrolidine, piperidine, piperazine, (3-aminopropyl)trimethoxysilane, (3-aminopropyl)triethoxysilane and (3-methylamino)propyltrimethoxysilane, aminoalcohols, for example 2-aminoethanol, 2-methylaminoethanol, 2-(dimethylamino)ethanol, 2-(diethylamino)ethanol, 2-(dibutylamino)ethanol, diethanolamine, N-methyldiethanolamine, triethanolamine, 3-amino-1-propanol, 3-dimethylamino-1-propanol, 1-amino-2-propanol, 1-dimethylamino-2-propanol, 1-diethylamino-2-propanol, bis(2-hydroxypropyl)amine, bis(2-hydroxypropyl)methylamine, 2-(hydroxyethyl)bis(2-hydroxypropyl)amine, tris(2-hydroxypropyl)amine, 4-amino-2-butanol, 2-amino-2-methylpropanol, 2-amino-2-methylpropane-1,3-diol, 2-amino-2- hydroxypropylpropane-1,3-diol and N-(2-hydroxyethyl) piperidine, etheramines, for example 2-methoxyethylamine, 3-methoxypropylamine, 2-(2-dimethylaminoethoxy)ethanol and 1,4-bis(3-aminopropoxy)butane or aromatic di- and triamines having at least one alkyl substituent having 1 to 3 carbon atoms at the aromatic ring, for example tolylene-2,4-diamine, tolylene-2,6-diamine, 1-methyl-3,5-diethyl-2,4-diaminobenzene, 1,3-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 3,3'-dimethyl-4,4'-diaminodiphenylmethane, 1-ethyl-2,4-diaminobenzene, 1-ethyl-2,6-diaminobenzene, 2,6-diethylnaphthylene-1,5-diamine, 4,4'-methylenebis(2,6-diisopropylaniline).

It is also possible to use polyamines, for example the polyaspartic acid derivatives known from EP-B 0 403 921, or else polyamines the amino groups of which are in blocked form, for example polyketimines, polyaldimines or oxazolanes. The effect of moisture on these blocked amino groups is to convert them into free amino groups and, in the case of the oxazolanes, into free hydroxyl groups as well, which can be consumed by crosslinking reaction with the isocyanate groups.

Suitable amino-functional components are in particular polyaspartic esters such as are obtainable for example by the process of EP-B 0 403 921 by reaction of diamines with fumaric or maleic esters.

Preferred amino-functional compounds are polyether polyamines having 2 to 4, preferably 2 to 3 and particularly preferably 2 aliphatically bonded primary amino groups and a number-average molecular weight Mn of 148 to 12 200, preferably 148 to 8200, particularly preferably 148 to 4000 and very particularly preferably 148 to 2000 g/mol. Particularly suitable thiols are compounds having at least two thiol groups per molecule.

Preferred polythiols are selected for example from the group consisting of simple alkanethiols, for example methanedithiol, ethane-1,2-dithiol, propane-1,1-dithiol, propane-1,2-dithiol, propane-1,3-dithiol, propane-2,2-dithiol, butane-1,4-dithiol, butane-2,3-dithiol, pentane-1,5-dwithiol, hexane-1,6-dithiol, propane-1,2,3-trithiol, cyclohexane-1,1-dithiol, cyclohexane-1,2-dithiol, 2,2-dimethylpropane-1,3-dithiol, 3,4-dimethoxybutane-1,2-dithiol or 2-methylcyclohexane-2,3-dithiol, thioether group-containing polythiols, for example 2,4-dimercaptomethyl-1,5-dimercapto-3-thiapentane, 4-mercaptomethyl-1,8-dimercapto-3,6-dithiaoctane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 5,6-bis(mercaptoethylthio)-1,10-dimercapto-3,8-dithiadecane, 4,5-bis(mercaptoethylthio)-1,10-dimercapto-3,8-dithiadecane, tetrakis(mercaptomethyl)methane, 1,1,3,3-tetrakis(mercaptomethylthio)propane, 1,1,5,5-tetrakis(mercaptomethylthio)-3-thiapentane, 1,1,6,6-tetrakis(mercaptomethylthio)-3,4-dithiahexane, 2-mercaptoethylthio-1,3-dimercaptopropane, 2,3-bis(mercaptoethylthio)-1-mercaptopropane, 2,2-bis(mercaptomethyl)-1,3-dimercaptopropane, bis(mercaptomethyl) sulfide, bis(mercaptomethyl) disulfide, bis(mercaptoethyl) sulfide, bis(mercaptoethyl) disulfide, bis(mercaptopropyl) sulfide, bis(mercaptopropyl) disulfide, bis(mercaptomethylthio)methane, tris(mercaptomethylthio)methane, bis(mercaptoethylthio)methane, tris(mercaptoethylthio)methane, bis(mercaptopropylthio)methane, 1,2-bis(mercaptomethylthio)ethane, 1,2-bis(mercaptoethylthio)ethane, 2-mercaptoethylthio)ethane, 1,3-bis(mercaptomethylthio)propane, 1,3-bis(mercaptopropylthio)propane, 1,2,3-tris(mercaptomethylthio)propane, 1,2,3-tris(mercaptoethylthio)propane, 1,2,3-tris(mercaptopropylthio)propane, tetrakis(mercaptomethylthio)methane, tetrakis(mercaptoethylthiomethyl)methane, tetrakis(mercaptopropylthiomethyl)methane, 2,5-dimercapto-1,4-dithiane, 2,5-bis(mercaptomethyl)-1,4-dithiane and its oligomers obtainable according to JP-A 07118263, 1,5-bis(mercaptopropyl)-1,4-dithiane, 1,5-bis(2-mercaptoethylthiomethyl)-1,4-dithiane, 2-mercaptomethyl-6-mercapto-1,4-dithiacycloheptane, 2,4,6-trimercapto-1,3,5-trithiane, 2,4,6-trimercaptomethyl-1,3,5-trithiane or 2-(3-bis(mercaptomethyl)-2-thiapropyl)-1,3-dithiolane, polyesterthiols, for example ethylene glycol bis(2-mercaptoacetate), ethylene glycol bis(3-mercaptopropionate), diethylene glycol 2-mercaptoacetate, diethylene glycol 3-mercaptopropionate, 2,3-dimercapto-1-propanol 3-mercaptopropionate, 3-mercaptopropane-1,2-diol bis(2-mercaptoacetate), 3-mercaptopropane-1,2-diol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerol tris(2-mercaptoacetate), glycerol tris(3-mercaptopropionate), cyclohexane-1,4-diol bis(2-mercaptoacetate), cyclohexane-1,4-diol bis(3-mercaptopropionate), hydroxymethyl sulfide bis(2-mercaptoacetate), hydroxymethyl sulfide bis(3-mercaptopropionate), hydroxyethyl sulfide 2-mercaptoacetate, hydroxyethyl sulfide 3-mercaptopropionate, hydroxymethyl disulfide 2-mercaptoacetate, hydroxymethyl disulfide 3-mercaptopropionate, (2-mercaptoethyl ester) thioglycolate or bis(2-mercaptoethyl ester) thiodipropionate and aromatic thio compounds, for example 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, toluene-2,5-dithiol, toluene-3,4-dithiol, naphthalene-1,4-dithiol, naphthalene-1,5-dithiol, naphthalene-2,6-dithiol, naphthalene-2,7-dithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 2,2'-dimercaptobiphenyl or 4,4'-dimercaptobiphenyl. Such polythiols may be used individually or else in the form of any desired mixtures with one another.

Sulfur-containing hydroxyl compounds are likewise suitable. Such compounds preferably contain at least one sulfur atom in the form of thio groups, thioether groups, thioesterurethane groups, esterthiourethane groups and/or polythioesterthiourethane groups, and at least one OH group.

Preferred sulfur-containing hydroxyl compounds may be selected from the group consisting of simple mercaptoalcohols, for example 2-mercaptoethanol, 3-mercaptopropanol, 1,3-dimercapto-2-propanol, 2,3-dimercaptopropanol or dithioerythritol, alcohols containing thioether structures, for example di(2-hydroxyethyl) sulfide, 1,2-bis(2-hydroxyethylmercapto)ethane, bis(2-hydroxyethyl) disulfide or 1,4-dithiane-2,5-diol and sulfur-containing diols having polyesterurethane, polythioesterurethane, polyesterthiourethane or polythioesterthiourethane structure of the type recited in EP-A 1 640 394. Such sulfur-containing hydroxyl compounds may be used individually or else in the form of any desired mixtures with one another.

Particularly preferred sulfur-containing compounds are polyether and polyester thiols of the type mentioned. Very particularly preferred compounds may be selected from the group consisting of 4-mercaptomethyl-1,8-dimercapto-3,6-dithiaoctane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, trimethylolpropane tris(2-mercaptoacetate), trimethylolpropane tris(3-mercaptopropionate), pentaerythritol tetrakis(2-mercaptoacetate) and pentaerythritol tetrakis(3-mercaptopropionate).

Likewise suitable as compounds having isocyanate-reactive groups are carboxylic acids, carboxylic anhydrides and epoxides.

It is likewise possible for the isocyanate-reactive component to comprise mixtures of different compounds having isocyanate-reactive groups.

In principle, the isocyanate group-containing component b. can contain any desired mixtures of different polyisocyanates. These may be the mixtures of oligomeric and monomeric polyisocyanates already described hereinabove. Mixtures of different isocyanate-terminated prepolymers may also be concerned. The free combination of all suitable polyisocyanates makes it possible to adjust the properties of the formulation and coatings produced therefrom as desired.

It is also preferable, for the isocyanate group-containing component b., to mix isocyanate-terminated prepolymers with monomeric or oligomeric polyisocyanates. This embodiment of the invention has the advantage that monomeric and/or oligomeric polyisocyanates may be used to reduce the viscosity of an isocyanate-terminated prepolymer. Since the monomeric/oligomeric polyisocyanates may be crosslinked with one another and with the isocyanate-terminated prepolymer by their isocyanate groups, these are bound in the formulation at the end of the preparation thereof. They therefore act as reactive diluents.

In a preferred embodiment of the formulation, the formulation has at least one of the following properties at room temperature (23° C.):
  (A) a starting viscosity in a range from 1 to 200 mPas, preferably from 1 to 100 mPas, or preferably from 5 to 50 mPas, or preferably from 5 to 20 mPas;
  (B) a starting viscosity in a range from 30 to 1000 mPas, preferably from 50 to 500 mPas, or preferably from 100 to 500 mPas;
  (C) a starting viscosity in a range from 50 to 2000 mPas, or preferably from 100 to 1500 mPas, or preferably from 150 to 100 mPas;
  (D) a starting viscosity in a range from 1000 to 100 000 mPas, preferably from 2000 to 90 000 mPas, or preferably from 2500 to 50 000 mPas;
  (E) a content of isocyanate groups of less than 60% by weight, preferably of less than 50% by weight, or preferably of less than 30% by weight, or preferably of less than 10% by weight, or preferably of less than 5% by weight, or based on the total amount of the formulation;
wherein the formulation has one of the properties selected from (A) to (D) in combination with property (E). The viscosities are carried out according to the process as described under measurement methods.

More preferably, the formulation has a content of isocyanate groups in a range from 2% to 60% by weight, or preferably in a range from 3% to 50% by weight, or preferably in a range from 4% to 35% by weight, or preferably in a range from 5% to 20% by weight, based on the total amount of the formulation.

In a preferred embodiment of the formulation, the formulation has at least one of the following properties at room temperature:
  (A) a starting viscosity in a range from 5 to 20 mPas; or
  (B) a starting viscosity in a range from 100 to 500 mPas; or
  (C) a starting viscosity in a range from 150 to 1000 mPas; or
  (D) a starting viscosity in a range from 2500 to 50 000 mPas; and/or
  (E) a content of isocyanate groups of 2% to 60% by weight, based on the total amount of the formulation;
wherein the formulation has one of the properties selected from (A) to (D) in combination with property (E).

The invention preferably relates to a storage-stable, isocyanate group-containing formulation comprising the components:
  a. at least one pigment,
  b. optionally at least one isocyanate group-containing component which has free isocyanate groups,
  c. at least one wetting agent and/or dispersant,
  d. at least one isocyanate group-containing grinding resin comprising free isocyanate groups and
  e. optionally solvents,
wherein the molar ratio of the sum of all isocyanate groups of the isocyanate-containing formulation to the sum of all isocyanate-reactive groups which are not isocyanate groups in the formulation is at least 8:1, wherein the formulation has at least one of the following properties at room temperature:
  (A) a starting viscosity in a range from 5 to 20 mPas; or
  (B) a starting viscosity in a range from 100 to 500 mPas; or
  (C) a starting viscosity in a range from 150 to 1000 mPas; or
  (D) a starting viscosity in a range from 2500 to 50 000 mPas; and/or
  (E) a content of isocyanate groups of 2% to 60% by weight, based on the total amount of the formulation;
and wherein the formulation has one of the properties selected from (A) to (D) in combination with property (E).

The formulation more preferably has a content of isocyanate groups in a range from 5% to 20% by weight, based on the total amount of the formulation.

The viscosity determinations for (A) to (D) were carried out using a Physica MCR 301 (Anton Paar GmbH) with a plate/plate (diameter 40 mm) measurement geometry at 20° C. measurement temperature. All viscosity data relate to a shear rate of 500 [1/s].

The dispersed pigments are preferably present in the formulation with an average particle size (Z-average) of less than 20 μm, or preferably of less than 5 μm, or preferably of less than 1 μm, or preferably of less than 0.5 μm, or preferably of less than 0.2 μm. It is also preferable for the distribution to be monomodal. It is additionally preferable for the distribution indicated by the polydispersity index (PDI) to be less than 0.6, or preferably less than 0.45, or preferably less than 0.35 or preferably less than 0.2.

In a preferred embodiment of the formulation, the formulation exhibits a rise in the particle size on storage at 50° C. and standard pressure over a period of 3 days of less than 500%, based on the original particle size of the formulation, based on the Z-average, which indicates the intensity-weighted harmonic mean of the hydrodynamic diameter, measured by means of dynamic light scattering. The particle size measurements were conducted by means of dynamic light scattering using a Zetasizer Nano ZS (Malvern Instruments Ltd.) at a temperature of 20° C. The polydispersity index is likewise determined with the aid of the Zetasizer Nano ZS.

Component c. can comprise either wetting agents or dispersants or possibly wetting agents and dispersants. Component c. can contain compounds which function both as wetting agent and as dispersant. The wetting agent c. used may be all compounds to those skilled in the art that are suitable for wetting pigments.

For the reliable dispersion and stabilization of pigments in coating systems, dispersants are generally used in order to reduce the mechanical shear forces required for an effective dispersion of the solids and at the same time to realize the maximum possible levels of filling. The dispersants assist the breaking up of agglomerates, and, being surface-active materials, wet and cover the surface of the particles to be dispersed, and stabilize them against undesired reagglomeration. The stabilization of the pigments is of major significance for example in the coatings industry, since pigments, as important formulation constituent, determine the optical appearance and the physicochemical properties of a coating. In order for them to be able to develop their action optimally in the coating, they should be distributed uniformly and finely in the coating material during the dispersion process. The finely dispersed pigments should be stabilized so that this situation is maintained during the preparation, the storage, the processing and the subsequent application, such as film formation. A recombining of the primary particles and aggregates may result in the formation of deposits in the form of hard and/or soft sediments, in an increase in viscosity, in losses of gloss, in insufficient color depth, in low coverage, in flooding or floating of the pigments and in poorly reproducible color tones, as already described in Goldschmidt, Streitberger; BASF Handbuch Lackiertechnik, BASF Munster and Vincentz Verlag Hannover 2002, p. 205 ff.

Preference is given to using Bykjet® 9131 or Disperbyk® 2200, or a mixture of these.

Those skilled in the art know that a large number of pigments, for example for use in printing inks, coating materials or related fields of application, are only poorly dispersible in formulations. In order to reduce the energy input necessary for dispersing pigment particles in a liquid medium, wetting agents and dispersants are therefore often used. A large number of different substances are known which are used today as dispersants for pigment and fillers.

The dispersant c. is preferably selected from the group consisting of polymers and copolymers having functional groups and/or groups with pigment affinity, alkylammonium salts of polymers and copolymers, polymers and copolymers having acidic groups, comb and block copolymers, such as block copolymers having basic groups with pigment affinity, modified acrylate block copolymers, modified polyurethanes, modified polyamines and/or polyamines that have been converted to salts, epoxide-amine adducts, phosphoric esters of polyethers, polyesters and polyether esters, basic or acidic ethoxylates such as alkoxylated mono- or polyamines or acidic 1,2-dicarboxylic anhydride monoesters of alkoxylated monoalcohols, reaction products of unsaturated fatty acids with mono-, di- and polyamines, aminoalcohols, and unsaturated 1,2-dicarboxylic acids and their anhydrides and their salts and reaction products with alcohols and/or amines; polymers and copolymers with fatty acid esters, modified polyacrylates, such as transesterified polyacrylates, modified polyesters, such as acid-functional and/or amino-functional polyesters, polyphosphates, and mixtures of at least two of these.

Dispersants selected are preferably those compounds such as have been described in the documents EP 0 154 678 B1, EP 0 270 126 B1, EP 031899981, EP 041749081, EP 0879860 B1, EP 0893155 B1, EP 1081 169 B1, EP1416019 A1, EP 1486 524 A1, EP 1593 700 B1, EP 1640 389 A1, EP 1650 246 A1, EP 1742 990, EP 1803 753, EP 1837 355, DE 102006048144, DE 102006062439, DE 102006062440, DE 102006062441 and DE 102007005720.

The isocyanate group-containing grinding resin d. used, which comprises free isocyanate groups, can be any compounds that those skilled in the art would choose as isocyanate group-containing grinding resin for a formulation according to the invention. These compounds are preferably likewise selected from the group of the isocyanate group-containing compounds which have already been described for the isocyanate group-containing component b.

The isocyanate group-containing component b. and the isocyanate group-containing grinding resin d. preferably differ in at least one property. The viscosity of component b. is preferably different from the viscosity of the grinding resin d., preferably in a range from 20 to 10 000 mPas, more preferably in a range from 30 to 5000 mPas. The isocyanate group-containing grinding resin d. further preferably has a higher viscosity, preferably a viscosity which is at least 20 mPas, more preferably at least 50 mPas, higher than the isocyanate group-containing component b. The grinding resin is preferably selected such that it is ideally suited for dispersing the pigments, while the isocyanate-containing component b. is selected such that the desired viscosity or the desired functionality of the formulation is obtained.

The isocyanate group-containing grinding resin d. further preferably has a higher viscosity than the isocyanate group-containing component b.

The isocyanate group-containing grinding resin can also consist of any desired mixture of the different compounds described for component d.

Suitable solvents are all solvents e. which can preferably fully dissolve the isocyanate group-containing component b. Preference is given to using solvents which react only slowly, if at all, with isocyanates and which preferably fully dissolve the latter and have a boiling point >30° C. and <300° C. Preference is also given to solvents e. which have a low water content, preferably less than 1% by weight, preferably less than 0.5% by weight, or preferably less than 0.1% by weight, or preferably less than 0.01% by weight, based on the total amount of solvent e.

Examples include solvents comprising structural elements selected from ketone, ester, ether, alicyclic rings, heterocyclic rings, aromatics, chlorine and any desired mixtures thereof such as for example ethyl acetate, butyl acetate, methoxypropyl acetate, acetone, methyl ethyl ketone, methyl isobutyl ketone, cyclohexanone, toluene, xylene, DMSO, DMF, N-methyl-2-pyrrolidone, N-ethyl-2-pyrrolidone, ethylene glycol dimethyl ether, bis(2-methoxyethyl) ether, Solvent Naphtha® 100 and mixtures thereof. Preferred solvents are methyl ethyl ketone, ethyl acetate, butyl acetate, butyl glycol acetate and 2-ethylhexyl acetate.

The solvent e. can be either a single solvent or any desired mixture of at least 2, preferably above-mentioned, solvents.

Should isocyanate-reactive groups be present in the solvent e., these groups are taken into account when determining the ratio of isocyanate groups to isocyanate-reactive groups when preparing the formulation. The content of isocyanate-reactive groups in the solvent e. is preferably less than 20% by weight, or preferably less than 10% by weight, or preferably less than 5% by weight, or preferably less than 3% by weight, based on the total amount of solvent e.

The invention further provides a process for preparing storage-stable isocyanate group-containing formulations at least comprising the steps:
i. dispersing at least one pigment a. in at least one isocyanate group-containing grinding resin d. which has free isocyanate groups in the presence of at least one wetting agent and/or dispersant c. and optionally a solvent e. or a solvent mixture, to obtain a pigment dispersion, wherein the customary dispersing apparatuses known to those skilled in the art can be used, until the desired particle size of the at least one pigment is reached,
ii. optionally diluting the pigment dispersion obtained from step i. with solvent e.,
iii. optionally mixing the pigment dispersion from step i. or step ii. with an isocyanate group-containing component b. which comprises free isocyanate groups to obtain the isocyanate group-containing formulation,
wherein the molar ratio of the sum of the isocyanate groups to the sum of all isocyanate-reactive groups in the formulation which are not isocyanate groups is at least 8:1, or preferably at least 11:1, or preferably at least 15:1, or preferably at least 20:1, or preferably at least 50:1, or preferably at least 100:1.

Preferably, in the process the steps are performed in the sequence i. first, then optionally ii., and only then optionally iii.

In a preferred embodiment of the process, the time between steps i. and iii. is not more than 60 minutes, more preferably ≤45 minutes, particularly preferably ≤30 minutes, very particularly preferably ≤15 minutes.

Stable, in particular storage-stable, isocyanate group-containing formulations within the context of the invention are preferably distinguished by the fact that the viscosity during a storage of at least 3 days, or preferably at least 5 days, or preferably of at least 7 days, or preferably of at least 10 days, or preferably of at least 14 days, at 50° C. merely exhibit a rise in viscosity of ≤500%, preferably of ≤300%, or preferably of ≤200%, or preferably of ≤100%, or preferably of ≤50%. Especially preferably, the rise in the viscosity during a storage of 3 days at 50° C. of the formulation is ≤100%, based on the starting viscosity. More preferably, the rise in the particle size of the isocyanate group-containing formulation, measured with dynamic light scattering after redispersion of any soft sediments formed, based on the Z-average, is at most 500%, preferably at most 200%, preferably at most 100%, preferably at most 50%. "Soft sediments" are understood within the context of the invention to mean that the sediments redisperse as a result of shaking.

Storage-stable isocyanate group-containing formulations are preferably distinguished by the fact that they do not form any hard sediments during the storage. "Hard sediments" are understood within the context of the invention to mean that the sediments cannot be redispersed by shaking. "Shaking" is preferably understood to mean shaking by hand or by means of customary laboratory shaking machines. The laboratory shaker used was an IKA® VORTEX 2 at a speed of 2000 rpm, with the shaking time preferably being in a range from 10 to 60 seconds, or preferably in a range from 15 to 40 seconds.

The invention further provides for the use of the formulation according to the invention for the coating or printing of substrate surfaces in order to obtain coated objects. In order to obtain coated objects, the formulation according to the invention is preferably applied to the object.

The invention further relates to an object coated or printed in accordance with the use according to the invention. The coating or printing is in this case preferably effected over the entire surface, but can alternatively also be effected only on a portion of the surface of the substrate.

In a preferred embodiment of the object, the substrate is selected from the group consisting of textile, wood, plastic, glass, ceramic, carbon, metal or a combination of at least two of these. The coating is preferably effected in the form of a continuous layer at least on a portion of the surface.

The coating is preferably effected by means of a process that those skilled in the art would choose for this purpose. The coating is preferably selected from the group consisting of painting, casting, knife-coating, spraying, dipping, flow-coating, rolling or a combination of at least two of these. All process variants known in the art can be used for this.

The printing can be any printing that those skilled in the art would use for this purpose. The printing is preferably selected from relief printing, intaglio printing, planographic printing, porous printing, pad printing, stamp printing, frottage printing, emboss printing, offset printing, screen printing, digital printing or a combination of at least two of these. Preferred digital printing processes are inkjet and valvejet processes and processes which operate on a similar basis.

The invention further relates to the use of the formulation according to the invention as an ink. In order to obtain objects printed with the ink, the formulation according to the invention is preferably printed onto the object.

A preferred embodiment of the use according to the invention of the formulation according to the invention as an ink is the formulation as an ink for digital printing. As an ink for digital printing, the formulation preferably has a viscosity in a range from 1 to 200 mPas, or preferably in a range from 1 to 100 mPas, or preferably in a range from 3 to 50 mPas, or preferably in a range from 3 to 20 mPas.

The invention further relates to a printed object obtainable using the formulation according to the invention as an ink, in particular as an ink for digital printing processes.

In a preferred embodiment, the material of the object is selected from the group consisting of textile, wood, plastic, glass, ceramic, carbon, metal or a combination of at least two of these.

The invention further relates to the use of a polyisocyanate as a grinding resin d. for pigments a. The polyisocyanate is preferably from the group of the isocyanate group-containing compounds as have already been described for the isocyanate group-containing component b. in connection with the storage-stable, isocyanate group-containing formulation according to the invention, which compounds contain more than one isocyanate group.

In a preferred embodiment of the use of the polyisocyanate as a grinding resin d., the grinding resin d. has a viscosity in a range from 100 to 5000 mPas, or preferably in a range from 200 to 2000 mPas, or preferably in a range from 350 to 1000 mPas.

Measurement Methods:

All percentages involving weight figures always relate to percent by weight, unless otherwise indicated.

All viscosity determinations were carried out using a Physica MCR 301 (Anton Paar GmbH) with a plate/plate (diameter 40 mm) measurement geometry at 20° C. measurement temperature. All viscosity data relate to a shear rate of 500 [1/s], unless otherwise indicated. The starting viscosity is defined according to the invention as the viscosity as of 1 hour after combining all of the desired components, in particular the selected components a. to d.

All particle size measurements were conducted by means of dynamic light scattering using a Zetasizer Nano ZS (Malvern Instruments Ltd.) at a temperature of 20° C. All measured values always relate to the intensity-weighted harmonic mean of the hydrodynamic diameter (Z-average).

EXAMPLES

Agglomerated pigment particles were comminuted during the production of pigment pastes. A high input of energy into the material to be ground was necessary for this. The energy can be input, for example, by means of ultrasound, rotor-stator systems or roller mills. A further method known to those skilled in the art is the grinding of the particle agglomerates in the medium in which they are to be dispersed, for example in ball or bead mills. The production of pigmented pastes was produced using a Dispermat LC30 (VMA-Getzmann GmbH) in a 125 ml double-walled temperature-controlled vessel made from stainless steel. In a first step, all materials were weighed into this vessel and mixed by hand. In the case of Disperbyk® 2200, this was dissolved in the solvent p-xylene 30 minutes before all components were added. Subsequently, the mixture was predispersed using a dispersing disk (diameter 30 mm) for 10 minutes at 10 000 rpm until a homogeneous material (material to be ground) was formed. The dispersing tool was then replaced by a single grinding disk made from polyamide (diameter 32 mm). Zirconium oxide beads (yttrium-stabilized) having an average diameter of 0.6 to 0.8 mm were subsequently added to the material to be ground. The material to be ground was finely ground for 90 minutes at a rotational speed of 14 000 rpm with continuous cooling. After dispersion, the grinding beads were removed by filtration.

The pigmented isocyanate group-containing formulations were prepared using an isocyanate group-containing grinding resin as follows:

The pigmented paste was initially charged in a 30 ml glass vessel within at most 60 minutes following its preparation. The solvent (if present in the formulation) was subsequently added gradually with stirring. In a final step, the isocyanate component was added gradually with stirring until a homogeneous mixture was obtained.

Materials

Organic pigments were obtained from Clariant SE, inorganic titanium dioxide was obtained from Kronos Worldwide Inc. and black carbon black pigments were obtained from Orion Engineered Carbons GmbH. The precise product designations can be seen in Table 1.

TABLE 1

| | | Pigments (component a.) | | | | | |
|---|---|---|---|---|---|---|---|
| No. | Name | Manufacturer | Pigment color | Color Index | Pigment class (chemical) | Density (g/cm$^3$) | Primary particle size (nm) |
| 1 | Hostaperm ® Blue BT-617-D | Clariant SE | Cyan | P.B 15:4 | Phthalocyanine | 1.62 | 65 |
| 2 | Inkjet Magenta 5EB02 | Clariant SE | Magenta | P.V. 19 | Quinacridone | 1.5 | 70 |
| 3 | Inkjet Yellow 4GC | Clariant SE | Yellow | P.Y. 155 | Disazo | 1.5 | 90 |
| 4 | Kronos ® 2310 | Kronos Worldwide Inc. | White | P.W. 6 | Titanium dioxide | 4 | n.s.* |
| 5 | NIPex ® 35 | Orion Engineered Carbons GmbH | Black | P. Bk. 7 | Furnace carbon black | n.s. | 31 |

*n.s. = not specified

Solvents are available from a large number of manufacturers. Solvents from Sigma-Aldrich and Fluka were used for the patent examples.

TABLE 2

Solvent (component d.)

| No. | Solvent | CAS number | Manufacturer |
|---|---|---|---|
| 1 | Butyl acetate (BuAc) ACS reagent, ≥99.5% (GC) | 123-86-4 | Sigma-Aldrich |
| 2 | Butyl glycol acetate (BGA) 99% | 112-07-2 | Sigma-Aldrich |
| 3 | p-Xylene, puriss. p.a. ≥99.0% (GC) | 106-42-3 | Fluka |

Wetting and dispersing auxiliaries (also called dispersing additives) can be obtained from various manufacturers. Products from Byk Additives & Instruments GmbH were used for the patent examples.

TABLE 3

Wetting and dispersing additive (component c.)

| No. | Dispersing additive | Manufacturer | Structure | Sum of hydroxyl, amine and acid numbers based on the additive as supplied (mg KOH/g) | Content of non-volatile matter (%) |
|---|---|---|---|---|---|
| 1 | Bykjet ® 9131 | Byk Additives & Instruments GmbH | Solution of a structured copolymer with groups having pigment affinity | 144 | 40 |
| 3 | Disperbyk ® 2200 | Byk Additives & Instruments GmbH | High molecular weight copolymer with groups having pigment affinity | 30.7 | 100 |

Isocyanate group-containing compounds were obtained from Covestro AG.

TABLE 4

Isocyanate group-containing compounds (component b.)

| No. | Isocyanate | Manufacturer | NCO content (%) |
|---|---|---|---|
| 1 | Desmodur ® H | Covestro AG | Hexamethylene diisocyanate (HDI), monomeric aliphatic diisocyanate having a molar mass of 168, an equivalent weight of 84, an NCO content ≥49.7% according to DIN EN ISO 11909 and a purity of ≥99.5% (GC). |
| 2 | Desmodur ® N3400 | Covestro AG | Aliphatic polyisocyanate (HDI uretdione) with an NCO content of 21.8 ± 0.7% according to DIN EN ISO 11909, a viscosity at 23° C. of 175 ± 75 mPas according to DIN EN ISO 3219/A.3 and a content of monomeric HDI ≤0.3% according to DIN EN ISO 10283 |
| 3 | Desmodur ® N3600 | Covestro AG | Aliphatic polyisocyanate (low-viscosity HDI trimer) with an NCO content of 23.0 ± 0.5% according to M105-ISO 11909, a viscosity at 23° C. of 1200 ± 300 mPas according to M014-ISO 3219/A.3 and a content of monomeric HDI ≤0.25% according to M106-ISO 10283. |

TABLE 5

Isocyanate group-containing grinding resin (component d.)

| No. | Isocyanate | Manufacturer | NCO content (%) |
|---|---|---|---|
| 1 | Desmodur ® N3600 | Covestro AG | Aliphatic polyisocyanate (low-viscosity HDI trimer) with an NCO content of 23.0 ± 0.5% according to M105-ISO 11909, a viscosity at 23° C. of 1200 ± 300 mPas according to M014-ISO 3219/A.3 and a content of monomeric HDI ≤0.25% according to M106-ISO 10283. |

TABLE 6

Formulations 1-12 with various NCO/NCO-reactive group ratios.

| | Example/initial weight [g] | | | | | | |
|---|---|---|---|---|---|---|---|
| | 1 (comparative) | 2 | 3 | 4 | 5 | 6 | 7 |
| Paste | | | | | | | |
| Isocyanate group-containing grinding resin d. (from Table 5) | | | | | | | |
| Desmodur ® N3600 | 4.73 | 4.73 | 37.00 | 4.53 | 40.33 | 40.33 | 40.33 |
| Pigments a. (from Table 1) | | | | | | | |
| Cyan 1 | 37.90 | 37.90 | | | | | |
| Magenta 2 | | | 25.38 | | | | |
| Yellow 3 | | | | 36.36 | | | |
| Black 4 | | | | | | | |
| White 5 | | | | | 42.45 | 42.45 | 42.45 |
| Wetting agent and/or dispersant c. (from Table 3) | | | | | | | |
| Bykjet ® 9131 | 40.79 | 40.79 | 23.56 | 39.06 | | | |
| Disperbyk ® 2200 | | | | | 2.12 | 2.12 | 2.12 |
| Solvent e. (from Table 2) | | | | | | | |
| BuAc/BGA 1:2 | 16.58 | 16.58 | 14.06 | 20.05 | 6.61 | 6.61 | 6.61 |
| p-Xylene | | | | | 8.49 | 8.49 | 8.49 |
| Formulation$^{x)}$ | | | | | | | |
| Paste composed of components a.-d. | 4.39 | 1.58 | 2.36 | 1.65 | 0.71 | 0.71 | 0.71 |
| BuAc/BGA 1:2 | 1.69 | 5.52 | 5.29 | 5.50 | 2.79 | | 1.39 |
| Isocyanate group-containing compound b. (from Table 4) | | | | | | | |
| Desmodur ® N3600 | 3.92 | 12.89 | 12.34 | 12.84 | 6.51 | | |
| Desmodur ® H | | | | | | 9.29 | |
| Desmodur ® N3400 | | | | | | | 7.90 |
| NCO/NCO-reactive group | 5 | 44 | 51 | 43 | 4804 | 14628 | 5485 |
| Starting viscosity [mPa*s] | 110.0 | 51.4 | 62.5 | 53.7 | 53.6 | 2.8 | 72.2 |
| Rel. change in viscosity [%], after a, b days of storage at 50° C. | Solid$^{a)}$ | 46.3$^{b)}$ | 58.2$^{b)}$ | 53.8$^{b)}$ | 22.0$^{b)}$ | 6.1$^{b)}$ | 27.6$^{b)}$ |
| Rel. change in the Z-average [%], after 14 days of storage at 50° C. | n.d.$^{xx)}$ | −7.6 | −2.4 | −5.6 | −0.8 | 36.9 | −6.7 |
| According to the invention | No | Yes | Yes | Yes | Yes | Yes | Yes |
| Stable | No | Yes | Yes | Yes | Yes | Yes | Yes |

| | Example/initial weight [g] | | | | | |
|---|---|---|---|---|---|---|
| | 7 | 8 | 9 | 10 | 11 | 12 |
| Paste | | | | | | |
| Isocyanate group-containing compound b. (from Table 4) | | | | | | |
| Desmodur ® N3600 | 34.31 | 34.31 | 34.31 | 45.13 | 45.13 | 45.13 |
| Pigments a. (from Table 1) | | | | | | |
| Cyan 1 | | | | | | |
| Magenta 2 | | | | 25.52 | 25.52 | 25.52 |
| Yellow 3 | | | | | | |
| Black 4 | 23.44 | 23.44 | 23.44 | | | |
| White 5 | | | | | | |
| Wetting agent and/or dispersant c. (from Table 3) | | | | | | |
| Bykjet ® 9131 | | | | | | |
| Disperbyk ® 2200 | 12.68 | 12.68 | 12.68 | 5.87 | 5.87 | 5.87 |
| Solvents d. (from Table 2) | | | | | | |
| BuAc/BGA 1:2 | | | | | | |
| p-Xylene | 29.57 | 29.57 | 29.57 | 23.48 | 23.48 | 23.48 |
| Formulation$^{x)}$ | | | | | | |
| Paste from components a.-d. | 1.13 | 1.13 | 1.13 | 1.17 | 1.17 | 1.17 |
| BuAc/BGA 1:2 | 2.66 | | 1.33 | 2.65 | | 1.32 |

TABLE 6-continued

Formulations 1-12 with various NCO/NCO-reactive group ratios.

Isocyanate group-containing compound b.
(from Table 4)

| | | | | | | |
|---|---|---|---|---|---|---|
| Desmodur ® N3600 | 6.21 | | | 6.18 | | |
| Desmodur ® H | | 8.87 | | | 8.83 | |
| Desmodur ® N3400 | | | 7.54 | | | 7.51 |
| NCO/NCO-reactive group | 490 | 1486 | 558 | 1039 | 3133 | 1180 |
| Starting viscosity [mPa*s] | 73.7 | 4.4 | 100.5 | 60.4 | 3.6 | 82.9 |
| Rel. change in viscosity [%] after a, b days of storage at 50° C. | 52.0[b] | 1.0[b] | 37.0[b] | 36.0[b] | 9.0[b] | 42.0[b] |
| Rel. change in the Z-average [%] after 14 days of storage at 50° C. | 3.0 | −8.1 | −1.2 | 6.6 | 5.2 | 23.0 |
| According to the invention | Yes | Yes | Yes | Yes | Yes | Yes |
| Stable | Yes | Yes | Yes | Yes | Yes | Yes |

[x]Formulations 1-13 were prepared from pastes 1-13,
[xx]could not be determined (solid), [a]: after 3, [b]: after 14 days Example 1 was solid after three days of storage at 50° C. and a determination of the viscosity was no longer possible. Example 1 is therefore not in accordance with the invention. Examples 2 to 13 exhibit a rise in viscosity of less than 500% within 14 days and are therefore in accordance with the invention.

The invention claimed is:

1. A storage-stable, isocyanate group-containing formulation comprising the components:
   a. 0.01% to 45% by weight of at least one pigment;
   b. 0% to 99% by weight of at least one isocyanate group-containing component which has free isocyanate groups;
   c. 0.01% to 20% by weight of at least one wetting agent and/or dispersant;
   d. 0.1% to 35% by weight of at least one isocyanate group-containing grinding resin comprising free isocyanate groups; and
   e. 0% to 80% by weight solvents,
   in each case based on a total amount of the formulation, with the sum of all constituents in the formulation not exceeding 100% by weight, wherein the formulation after storage at 50° C. over a period of at least 3 days exhibits a rise in viscosity of less than 500%, based on a starting viscosity of the formulation which is determined as of 1 hour after combining all of the components, wherein the viscosity determination is carried out in each case at 20° C. at a shear rate of 500 [ 1/s], wherein a molar ratio of the sum of all isocyanate groups of the isocyanate group-containing formulation to a sum of all isocyanate-reactive groups which are not isocyanate groups in the formulation is at least 8:1, wherein the isocyanate group-containing grinding resin d. has a viscosity in a range from 100 to 5000 mPas, and wherein the isocyanate group-containing grinding resin d. is selected from the group consisting of 1,4-iisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and/or 1,4-bis(isocyanatomethyl)benzene (XDI), 1,3- and/or 1,4-bis(1-isocyanato-1-methylethyl)benzene (TMXDI), 2,4- and/or 2,6-diisocyanatotoluene (TDI), 2,4'- and/or 4,4'-diisocyanatodiphenylmethane (MDI), 1,5-diisocyanatonaphthalene, 1-isocyanato-3,3,5-trimethyl-5-isocyanatomethylcyclohexane (IPDI), 1-isocyanato-1-methyl-4(3)-isocyanatomethylcyclohexane, 2,4'- and/or 4,4'-diisocyanatodicyclohexylmethane (H12MDI), a mixture of at least two of these, and optionally oligomers and reaction products of these.

2. The formulation as claimed in claim 1, wherein the isocyanate group-containing component b. is selected from the group consisting of 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- and/or 2,4,4-trimethyl-1,6-diisocyanatohexane, 1,10-diisocyanatodecane, 1,3- and/or 1,4-bis(isocyanatomethyl)benzene (XDI), 1,3- and/or 1,4-bis(1-isocyanato-1-methylethyl)benzene (TMXDI), 2,4- and/or 2,6-diisocyanatotoluene (TDI), 2,4'- and/or 4,4'-diisocyanatodiphenylmethane (MDI), 1,5-diisocyanatonaphthalene, 1-isocyanato-3,3,5-trimethyl-5-isocyanatomethylcyclohexane (IPDI), 1-isocyanato-1-methyl-4(3)-isocyanatomethylcyclohexane, 2,4'- and/or 4,4'-diisocyanatodicyclohexylmethane (H12MDI), a mixture of at least two of these, and optionally oligomers and reaction products of these.

3. The formulation as claimed in claim 1, wherein the isocyanate group-containing component b. and the isocyanate group-containing grinding resin d. comprise aliphatic or cycloaliphatic isocyanates or mixtures of these.

4. The formulation as claimed in claim 1, wherein the formulation has at least one of the following properties at room temperature:
   (A) a starting viscosity in a range from 1 to 200 mPas;
   (B) a starting viscosity in a range from 30 to 1000 mPas;
   (C) a starting viscosity in a range from 50 to 2000 mPas;
   (D) a starting viscosity in a range from 1000 to 100 000 mPas;
   (E) a content of isocyanate groups of less than 60% by weight, and greater than 3%, based on a total amount of the formulation.

5. The formulation as claimed in claim 1, wherein the formulation exhibits a rise in particle size on storage at 50° C. and standard pressure over a period of 3 days of less than 500%, based on an original particle size of the formulation, based on the intensity-weighted harmonic mean of the hydrodynamic diameter (Z-average) measured by dynamic light scattering.

6. A method of coating a substrate surface to obtain a coated object, comprising applying the storage-stable, isocyanate group-containing formulation of claim 1 to at least a portion of the substrate surface.

7. A coated object obtained as claimed in claim 6.

8. The object as claimed in claim 6, wherein the material of the object comprises textile, wood, plastic, glass, ceramic, carbon, metal, or a combination of at least two of these.

9. An ink, comprising the storage-stable, isocyanate group-containing formulation of claim 1.

10. A method of preparing a storage-stable, isocyanate group-containing formulation according to claim 1, comprising preparing the formulation with the grinding resin comprising the at least one isocyanate group-containing resin comprising free isocyanate groups.

11. The formulation as claimed in claim 4, wherein the formulation has one of the properties selected from (A) to (D) in combination with property (E).

12. The formulation as claimed in claim 1, wherein the formulation comprises the solvents e., and the isocyanate group-containing grinding resin d. comprises 1,6-diisocyanatohexane (HDI) and optionally oligomers and reaction products of these.

* * * * *